United States Patent
Wang et al.

(10) Patent No.: US 12,022,507 B2
(45) Date of Patent: Jun. 25, 2024

(54) WIRELESS CHANNEL SWITCHING

(71) Applicant: Telefonaktiebolaget LM Ericsson (publ), Stockholm (SE)

(72) Inventors: Min Wang, Luleå (SE); Jinhua Liu, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 558 days.

(21) Appl. No.: 17/276,262

(22) PCT Filed: Sep. 23, 2019

(86) PCT No.: PCT/EP2019/075494
§ 371 (c)(1),
(2) Date: Mar. 15, 2021

(87) PCT Pub. No.: WO2020/064615
PCT Pub. Date: Apr. 2, 2020

(65) Prior Publication Data
US 2022/0030623 A1    Jan. 27, 2022

(30) Foreign Application Priority Data
Sep. 26, 2018 (WO) ................ PCT/CN2018/107500

(51) Int. Cl.
*H04W 74/0808* (2024.01)
*H04W 24/08* (2009.01)
*H04W 74/0833* (2024.01)

(52) U.S. Cl.
CPC ....... *H04W 74/0808* (2013.01); *H04W 24/08* (2013.01); *H04W 74/0833* (2013.01)

(58) Field of Classification Search
CPC ......... H04W 74/0808; H04W 74/0833; H04W 24/08
See application file for complete search history.

(56) References Cited

U.S. PATENT DOCUMENTS

2016/0381567 A1    12/2016   Bhushan et al.
2017/0027002 A1    1/2017    Yerramalli et al.
(Continued)

FOREIGN PATENT DOCUMENTS

GB    2414899 A       7/2005
WO    2018062957 A1   4/2018

OTHER PUBLICATIONS

Nokia "Further discussion on eLAA RRM impacts" 3GPP TSG-RAN WG4 Meeting #80, Gothenburg, Sweden, Aug. 22-26, 2016, R4-166413, 4 pages.
InterDigital Inc. "Mobility for NR-U" 3GPP RAN WG2 Meeting #103, Gothenburg, Sweden, Aug. 20-24, 2018, R2-1811455, 5 pages.
International Search Report and the Written Opinion of the International Searching Authority, issued in corresponding International Application No. PCT/EP2019/075494, dated Feb. 3, 2020, 16 pages.
(Continued)

*Primary Examiner* — Gary Mui
(74) *Attorney, Agent, or Firm* — Rothwell, Figg, Ernst & Manbeck, P.C.

(57) ABSTRACT

Embodiments of the disclosure provide methods, apparatus and machine-readable media relating to wireless channel switching. A method performed by a wireless device for utilizing a portion of wireless spectrum shared between multiple radio-access technologies is provided, in which the portion of wireless spectrum comprises a plurality of channels at respective transmission frequencies. The method comprises detecting an event which is indicative of congestion at a first channel of the plurality of channels, wherein the first channel is assigned to the wireless device for accessing a cellular network. The method further comprises, responsive to detection of the event, initiating a procedure to switch to a second channel of the plurality of channels for accessing the cellular network.

16 Claims, 12 Drawing Sheets

(56) References Cited

U.S. PATENT DOCUMENTS

| | | | |
|---|---|---|---|
| 2018/0048413 A1 | 2/2018 | Liu et al. | |
| 2018/0139778 A1 | 5/2018 | Chou et al. | |
| 2018/0255576 A1* | 9/2018 | Bhorkar | H04W 74/0808 |
| 2019/0222290 A1* | 7/2019 | Ly | H04L 5/0098 |
| 2019/0313454 A1* | 10/2019 | Pu | H04W 24/02 |
| 2020/0059961 A1* | 2/2020 | Do | H04W 72/0453 |
| 2020/0275485 A1* | 8/2020 | Babaei | H04W 74/0808 |
| 2020/0374923 A1* | 11/2020 | Cheng | H04B 7/0626 |
| 2021/0068121 A1* | 3/2021 | Cui | H04L 5/0098 |
| 2021/0160927 A1* | 5/2021 | Shi | H04W 74/0816 |
| 2021/0212112 A1* | 7/2021 | Jia | H04W 24/08 |
| 2021/0352723 A1* | 11/2021 | Ye | H04W 74/008 |
| 2022/0039016 A1* | 2/2022 | Terry | H04W 52/0235 |
| 2022/0039096 A1* | 2/2022 | Wang | H04B 17/318 |
| 2022/0150969 A1* | 5/2022 | Babaei | H04W 74/0866 |

OTHER PUBLICATIONS

InterDigital Inc. "BWP operation in unlicensed spectrum" 3GPP RAN WG1 Meeting #92bis, R1-1804680, Sanya, China, Apr. 16-20, 2018, 4 pages.

ZTE "Considerations on mobility for NR-U" 3GPP TSG-RAN WG2 NR AH1807 Meeting, R2-1809838, Montreal, Canada, Jul. 2-6, 2018, 3 pages.

3GPP TS 36.300, V15.2.0 (Jun. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Jun. 2018, 357 pages.

3GPP TS 38.321 V15.3.0 (Sep. 2018), 3rd Generation Partnership Project; Technical Specification Group Radio Access Network; NR; Medium Access Control (MAC) protocol specification (Release 15), Sep. 2018, 76 pages.

* cited by examiner

WIRELESS CHANNEL SWITCHING

CROSS REFERENCE TO RELATED APPLICATION(S)

This application is a 35 U.S.C. § 371 National Phase Entry Application from PCT/EP2019/075494, filed Sep. 23, 2019, designating the United States, and also claims the benefit of International Application No. PCT/CN2018/107500, filed Sep. 26, 2018, the disclosures of which are incorporated herein by reference in their entirety.

TECHNICAL FIELD

Embodiments of the present disclosure relate to wireless communications in a cellular network, and particularly to methods and apparatus for switching channels in a cellular network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Next generation systems are expected to support a wide range of use cases with varying requirements ranging from fully mobile devices to stationary Internet of Things (IoT) or fixed wireless broadband devices. The traffic pattern associated with many use cases is expected to consist of short or long bursts of data traffic with a varying length of waiting period in between (here called an inactive state). In New Radio (NR), both license assisted access and standalone unlicensed operation are to be supported in 3GPP. Hence the procedure of physical random access channel (PRACH) transmission and/or scheduling request (SR) transmission in unlicensed spectrum shall be investigated in 3GPP. In the following, a channel sensing scheme based on listen before talk (LBT), random access procedure and LBT scheme for PRACH and short physical uplink control channel (sPUCCH) is introduced as a basis to address the problems.

In order to tackle the ever-increasing demand for data, NR considers both licensed and unlicensed spectrum. The standardization work for licensed spectrum in Rel-15 is still on-going and will be finished in 2018. Therefore, 3GPP has defined a study item on NR-based Access to Unlicensed Spectrum. In this study item, compared to the Long Term Evolution (LTE) license-assisted access (LM), the use of unlicensed spectrum in NR (also referred to as "NR-U" herein) also needs to support dual connectivity (DC) and standalone scenarios, where the medium access control (MAC) procedures including random access channel (RACH) and scheduling procedure on unlicensed spectrum are subject to the LBT failures. There was no such restriction in LTE LAA, since there was licensed spectrum in LAA scenario, so the RACH and scheduling related signaling can be transmitted on the licensed spectrum instead of the unlicensed spectrum.

The radio resource management (RRM) procedures in NR-U would be generally rather similar as in LAA, since NR-U is aiming to reuse LAA/eLAA/feLAA technologies as much as possible to handle the coexistence between NR-U and other legacy radio access technologies (RATs). Channel access/selection for LAA was one of the important aspects for co-existence with other RATs such as Wi-Fi. For instance, LAA has aimed to use carriers that are congested with Wi-Fi. Therefore, RRM measurements are one critical aspect to avoid congestion.

In the licensed spectrum, a UE measures Reference Signal Received Power (RSRP), and Reference Signal Received Quality (RSRQ) of the downlink radio channel, and provides the measurement reports to its serving eNB/gNB. However, such measurements do not reflect the interference strength on the carrier. Another metric Received Signal Strength Indicator (RSSI) can serve for such purpose. At the eNB/gNB side, it is possible to derive RSSI based on the received RSRP and RSRQ reports. The RSSI measurements together with the time information concerning when and how long the UEs made the measurements can assist the gNB/eNB to detect a hidden node. Additionally, the gNB/eNB can measure the load situation of the carrier, which is useful for the network to prioritize some channels for load balance and channel access failure avoidance purposes. However, this requires that RSRP and RSRQ must be available. Due to LBT failure, some reports in terms of RSRP or RSRQ may be blocked (e.g., due to reference signal transmission (demodulation reference signal) being blocked in the downlink or the measurement report being blocked in the uplink).

LTE LAA has defined measurements of averaged RSSI and channel occupancy for measurement reports. The channel occupancy is defined as the percentage of time that RSSI was measured above a configured threshold. For this purpose, a RSSI measurement timing configuration (RMTC) includes a measurement duration (e.g. 1-5 ms) and a period between measurements (e.g. {40, 80, 160, 320, 640} ms).

Listen-before-talk (LBT) is designed for unlicensed spectrum co-existence with other RATs. In this mechanism, a radio device applies a clear channel assessment (CCA) check before any transmission. The process involves energy detection (ED) over a time period or signal detection (SD), and comparison of the detected energy or signal to a certain threshold (e.g., ED or SD threshold) in order to determine if a channel is idle. If the channel is determined to be occupied, the transmitter performs a random back-off within a contention window before next CCA attempt. In order to protect ACK transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For Quality of Service (QoS) differentiation, a channel access priority based on the service type has been defined. For example, four LBT priority classes are defined for differentiation of contention window sizes (CWS) and MCOT between services.

One of the main intentions of the radio link failure (RLF) procedure in LTE was to assist the UE in performing a fast and reliable recovery without going via RRC_IDLE. This has the benefit of avoiding unnecessary latency due to RACH access in RRC_IDLE. FIG. 1 (based on FIG. 22.8 from the book LTE—The UMTS Long Term Evolution From Theory to Practice, 2nd edition, by Stefania Sesia, Issam Toufik and Matthew Baker) shows an illustration of radio link monitoring of a serving cell in LTE followed by radio resource control (RRC) re-establishment to the target cell.

In LTE, there are several reasons that may lead to the radio link failure, including:

1. Timer T310 expiry

While the UE is in RRC connected mode, the UE monitors the downlink radio channel quality based on one or more downlink reference symbols. The UE compares the measured downlink channel quality with the out-of-sync and in-sync thresholds, Qout and Qin respectively. The physical channel evaluates the downlink channel quality, and periodically sends an indication of out-of-sync or in-sync to layer 3. The UE layer 3 then evaluates radio link failure based on the in-sync and out-of-sync indications, after layer 3 filtering. When the number of consecutive out-of-sync indications reaches a counter N310, a timer T310 is started.

While T310 is running, the radio link is considered to be recovered if the UE consecutively receives N311 in-sync indications from the physical layer.

When the timer T310 expires without recovery of the radio link, a radio link failure is declared by the UE.

2. Maximum number of RLC retransmissions in uplink is reached

3. Handover failure and timer T304 expiry

During handover procedure, the timer T304 is started when the UE receives a handover command from the source cell. The value of the timer T304 is set to allow the UE to try the maximum number of RACH access attempts to the target cell. When the timer T304 expires, a radio link failure due to handover is detected.

When a radio link failure is triggered, radio connection re-establishment is triggered. A UE shall first perform cell search to determine the best cell for radio link re-establishment. According to 3GPP TS 36.300 (e.g., V 15.2.0), a UE can select the same cell, a different cell from the same eNB, or a prepared cell from a different eNB, wherein the activity can be resumed (i.e., the UE stays in connected mode) via radio connection re-establishment procedure, since the previous UE context can be recovered by inter-cell communication. However, when a prepared cell is not available, the UE selects an unprepared cell. In this case, the UE has to go to idle mode and try to setup the radio connection afterwards. In this case, activity of the UE cannot be resumed. Table 1 (based on Table 10.1.6-1 from 3GPP TS 36.300 v 15.2.0) guides the UE behavior for target cell selection.

TABLE 1

Mobility and Radio Link Failure

| Cases | First Phase | Second Phase | T2 expired |
|---|---|---|---|
| UE returns to the same cell | Continue as if no radio problems occurred | Activity is resumed by means of explicit signalling between UE and eNB | Go via RRC_IDLE |
| UE selects a different cell from the same Enb | N/A | Activity is resumed by means of explicit signalling between UE and eNB | Go via RRC_IDLE |
| UE selects a cell of a prepared eNB (NOTE) | N/A | Activity is resumed by means of explicit signalling between UE and eNB | Go via RRC_IDLE |
| UE selects a cell of a different eNB that is not prepared (NOTE) | N/A | Go via RRC_IDLE | Go via RRC_IDLE |

NOTE:
a prepared eNB is an eNB which has admitted the UE during an earlier executed HO preparation phase, or obtains the UE context during the Second Phase.

The MAC entity may be configured by RRC with a beam failure recovery procedure which is used for indicating to the serving gNB of a new synchronization signal block (SSB) or channel state information reference signal (CSI-RS) when beam failure is detected on the serving SSB(s)/CSI-RS(s). Beam failure is detected by counting beam failure instance indications provided by the lower layers to the MAC entity.

The MAC entity shall:

```
1>  if beam failure instance indication has been received from lower layers:
2>    start or restart the beamFailureDetectionTimer;
2>    increment BFI_COUNTER by 1;
2>    if BFI_COUNTER >= beamFailureInstanceMaxCount:
3>      if beamFailureRecoveryConfig is configured:
4>        start the beamFailureRecoveryTimer, if configured;
4>        initiate a Random Access procedure (see subclause 5.1) on the SpCell by applying the parameters powerRampingStep, preambleReceivedTargetPower, and preambleTransMax configured in beamFailureRecoveryConfig.
3>      else:
4>        initiate a Random Access procedure (see subclause 5.1) on the SpCell.
1>  if the beamFailureDetectionTimer expires:
2>    set BFI_COUNTER to 0.
1>  if the Random Access procedure is successfully completed (see subclause 5.1):
2>    stop the beamFailureRecoveryTimer, if configured;
2>    consider the Beam Failure Recovery procedure successfully completed.
```

The Scheduling Request (SR) is used for requesting uplink shared channel (UL-SCH) resources for new transmission.

The MAC entity may be configured with zero, one, or more SR configurations. An SR configuration consists of a set of PUCCH resources for SR across different bandwidth parts (BWPs) and cells. For a logical channel, at most one PUCCH resource for SR is configured per BWP.

Each SR configuration corresponds to one or more logical channels. Each logical channel may be mapped to zero or one SR configuration, which is configured by RRC.

If an SR is triggered and there are no other SRs pending that correspond to the same SR configuration, the MAC entity shall set the SR_COUNTER of the corresponding SR configuration to 0.

When an SR is triggered, it shall be considered as pending until it is cancelled. All pending SR(s) triggered prior to the MAC Protocol Data Unit (PDU) assembly shall be cancelled and each respective sr-ProhibitTimer shall be stopped when the MAC PDU is transmitted and this PDU includes a Buffer Status Report (BSR) MAC Control (CE) which contains buffer status up to (and including) the last event that triggered a BSR prior to the MAC PDU assembly. All pending SR(s) shall be cancelled when the UL grant(s) can accommodate all pending data available for transmission.

Only PUCCH resources on a BWP which is active at the time of SR transmission occasion are considered valid.

Carrier aggregation between licensed band NR (PCell) and NR-U (SCell)

NR-U SCell may have both DL and UL, or DL-only.

Dual connectivity between licensed band LTE (PCell) and NR-U (PSCell)

Stand-alone NR-U

An NR cell with DL in unlicensed band and UL in licensed band

Dual connectivity between licensed band NR (PCell) and NR-U (PSCell)

In this new study item, NR unlicensed operation (also referred to herein as "NR-U") needs to support both stand-alone and dual connectivity (DC) scenarios meaning that both RACH and PUCCH-SR signaling need to be transmitted over unlicensed spectrum cells, since an NR-U cell may operate as a primary cell. At the same time, the radio link monitoring function must also be defined by reusing the same mechanism as NR in the licensed spectrum, where the SSB or CSI RS can be configured for RLM purpose. Discovery reference signal in LTE LAA/eLAA/feLAA are under discussion in RAN1 as to whether/how it shall be also supported for NR-U. Prior to any uplink or downlink transmission, a LBT must be performed in order to grasp the channel access. In this case, an NR-U UE may experience consecutive LBT failures during PRACH, or PUCCH-SR transmission, resulting in the UE reaching the maximum

---

As long as at least one SR is pending, the MAC entity shall for each pending SR:
1> if the MAC entity has no valid PUCCH resource configured for the pending SR:
2> initiate a Random Access procedure (see subclause 5.1) on the SpCell and cancel the pending SR.
1> else, for the SR configuration corresponding to the pending SR:
2> when the MAC entity has an SR transmission occasion on the valid PUCCH resource for SR configured; and
2> if sr-ProhibitTimer is not running at the time of the SR transmission occasion; and
2> if the PUCCH resource for the SR transmission occasion does not overlap with a measurement gap; and
2> if the PUCCH resource for the SR transmission occasion does not overlap with a UL-SCH resource:
3> if SR_COUNTER < sr-TransMax:
4> increment SR_COUNTER by 1;
4> instruct the physical layer to signal the SR on one valid PUCCH resource for SR;
4> start the sr-ProhibitTimer.
3> else:
4> notify RRC to release PUCCH for all Serving Cells;
4> notify RRC to release SRS for all Serving Cells;
4> clear any configured downlink assignments and uplink grants;
4> initiate a Random Access procedure (see subclause 5.1) on the SpCell and cancel all pending SRs.
NOTE: The selection of which valid PUCCH resource for SR to signal SR on when the MAC entity has more than one overlapping valid PUCCH resource for the SR transmission occasion is left to UE implementation.

---

The MAC entity may stop, if any, ongoing Random Access procedure due to a pending SR which has no valid PUCCH resources configured, which was initiated by MAC entity prior to the MAC PDU assembly. Such a Random Access procedure may be stopped when the MAC PDU is transmitted using a UL grant other than a UL grant provided by Random Access Response, and this PDU includes a BSR MAC CE which contains buffer status up to (and including) the last event that triggered a BSR (see subclause 5.4.5) prior to the MAC PDU assembly, or when the UL grant(s) can accommodate all pending data available for transmission.

There currently exist certain challenge(s).

In RAN1 #92, the following agreements were reached for the Study on NR-based Access to Unlicensed Spectrum:

Study the additional functionality needed beyond the specifications for operation in licensed spectrum in the following deployment scenarios.

number of transmission attempts. The UE MAC would then trigger PUCCH-SR failure, or a PRACH problem.

In a first scenario, the UE may trigger a PUCCH-SR failure for any SR configuration due to LBT. In this case, the UE would then trigger a random access (RA) to inform the network of the SR failure while at the same time releasing its PUCCH, SRS, any uplink grant and any downlink assignment. If the PUCCH-SR failure is triggered due to LBT failure, the UE has a high risk of experiencing LBT failures during the random access due to system congestion. This will lead to a long latency for the intended data transfer (e.g., user plane data).

In a second scenario, the UE may trigger a RACH problem due to LBT failures. This further leads to the radio link failure if RA is initiated by a handover. The UE takes two steps to recover from the radio link failure. At the first step, a UE selects a prepared cell for radio link reestablishment while staying at RRC CONNECTED. If the radio link failure is not recovered, at the second step, the UE goes to RRC IDLE, and performs the initial access instead. At the first step, the UE may select the same serving cell for radio link reestablishment, since the channel occupancy is not considered in the measurement results on the cells. This may also lead to a long latency for the data transfer.

In a third scenario, the UE may detect a beam failure due to the LBT failures. Similarly as the first case, the beam failure recovery (BFR) triggered RA may also be blocked by the LBT failure.

A better method of recovering from LBT failures is therefore required.

SUMMARY

Certain aspects of the present disclosure and their embodiments may provide solutions to these or other challenges.

The present disclosure discusses methods for a UE to trigger and initiate channel switch according to preconfigured conditions and schemes. When the UE determines that the channel(s) are too busy to provide service(s) for the UE, the UE can select another channel according to preconfigured parameters and notify the gNB of the channel switch via certain procedure.

If the source channel(s) and the target channel(s) belong to different BWPs of the same carrier, the UE initiates a BWP switch procedure;

If the source channel(s) and the target channel(s) belongs to different carriers belongs to the same MAC entity, the UE initiates a carrier switch procedure;

If the source channels and the target channels belongs to different carriers and these different carriers belongs to different MAC entity, the UE initiates a handover procedure.

There are, proposed herein, various embodiments which address one or more of the issues disclosed herein.

For example, in a first aspect the disclosure provides a method performed by a wireless device for utilizing a portion of wireless spectrum shared between multiple radio-access technologies. The portion of wireless spectrum comprises a plurality of channels at respective transmission frequencies. The method comprises: detecting an event which is indicative of congestion at a first channel of the plurality of channels, the first channel being assigned to the wireless device for accessing a cellular network; and, responsive to detection of the event, initiating a procedure to switch to a second channel of the plurality of channels for accessing the cellular network.

Apparatus for performing the method outlined above is also provided.

Certain embodiments may provide one or more of the following technical advantage(s):

Improve the user experience for those served by a NR-U system;

Assist the network to balance the traffic load among channels;

Reduce the latency (or interruption) for provided services.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
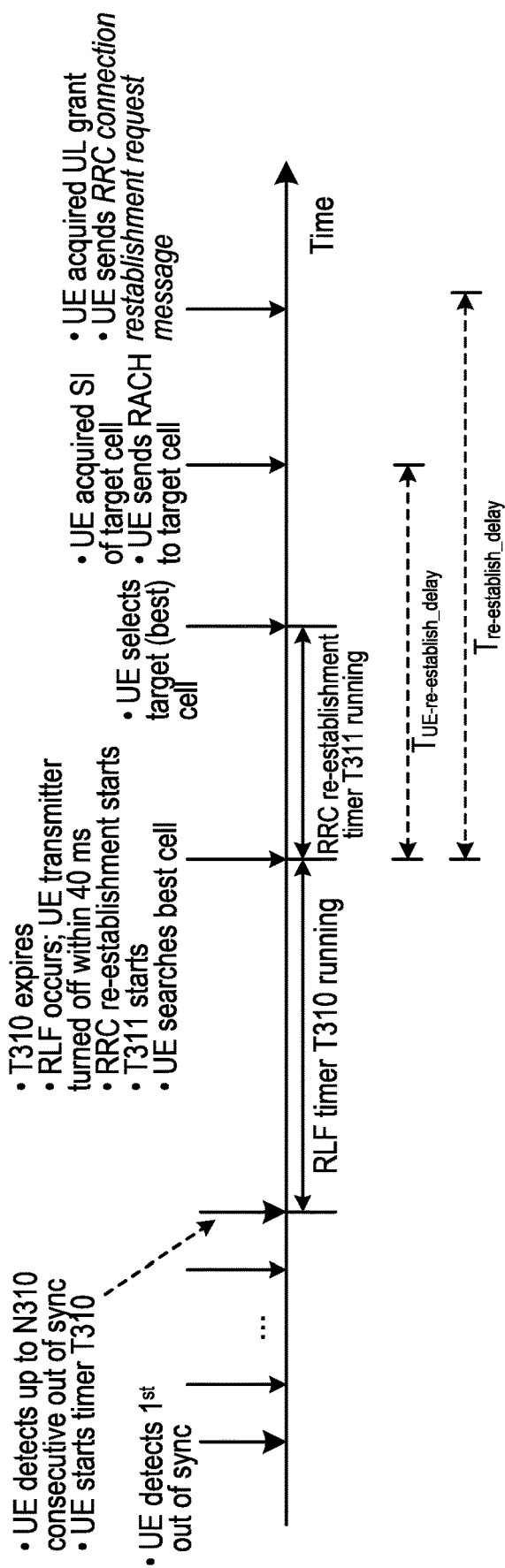
FIG. 1 shows an illustration of radio link monitoring and radio resource control re-establishment in long term evolution.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments of the disclosure may allow a UE served by an NR-U system to initiate a fast channel switch with reduced/simplified signaling between gNB and UE according to the channel occupancy status when the signaling interaction between the gNB and the UE is difficult. Some embodiments are exemplified below to initiate a channel switch by a UE in an NR-U system. Similar schemes can be applied in other unlicensed spectrum systems as well.

In a first step, a trigger at the UE, based on information provided by the Physical (PHY) layer, upper layer (e.g. RRC or MAC layer) may trigger a channel switch event. The switch event means that the UE is experiencing a high congestion/collision in the current serving channel/BWP/carrier/cell. The event may be triggered based on at least one of the following criteria:

1. A maximum number of consecutive LBT failures within a preconfigured interval is reached with respect to the transmission of one or multiple uplink physical channels, such as, for example, Physical Uplink Shared Channel (PUSCH), PRACH, PUCCH or Sounding Reference Signals (SRS). In this case, the PHY layer may need to send an indicator on the outcome of the LBT operation to the MAC layer.

2. Reaching a maximum time period between the transmission being triggered at the MAC and the transmission getting through on the PHY layer. In this case, the time periods for both the initial transmission and the retransmission attempts are considered. If the UE is experiencing LBT failures consecutively, the UE may only succeed to grasp the channel for the last transmission attempt.

3. The number of PUCCH SR transmission attempts without an UL grant in response from the gNB reaches a maximum number of times within a preconfigured time interval.
4. A maximum time period since the UE detects the last DL control reference signal is reached. In this case, the UE could not receive the DL RLM reference signals (SSB, CSI-RS or Demodulation Reference Signals (DRS)) since the gNB may experience LBT failures.
5. The channel occupancy of the channels to serve the UE exceeds a preconfigured threshold.

In a second step, when the event is triggered and reported to upper layer (e.g. MAC or RRC), the upper layer may further inform the physical layer to measure channels other than the channels that serve the UE. Once the measurement results are achieved, the physical layer report the best candidate channels/BWP/carrier/cell to upper layers.

In a third step, based on the available measurement results, the upper layer (RRC or MAC) determines whether or how to perform channel switch. Below are examples corresponding to different cases:

Channel/carrier switch handled by either MAC or RRC: if the best candidate channels belong to a different BWP of the current cell, or the best candidate channels belong to carrier X that belongs same MAC entity of the serving cell and carrier X is configured for the UE, either MAC or RRC can configure the UE to initiate a channel switch request via any of the following:
Handover procedure. This can be anyway applicable regardless the occupancy status of the serving BWP. Or
Instead of using RA procedure, the UE sends a BWP/carrier switch request via a MAC CE or RRC signaling message if uplink resource is available for PUSCH transmission.

Carrier switch handled by RRC: if the best candidate channels belongs to carrier Y, and carrier Y belongs to the same MAC entity of the serving cell but carrier Y is not configured for the UE, MAC layer shall further report the trigger event to the RRC upon the reception of the event and the measurement results from the physical layer. RRC may determine a RA procedure to setup a radio link with the new cell, That cell may further be configured as a secondary cell for the UE via RRC signaling Handover handled by RRC: if the best candidate channels belongs to carrier Z, and carrier Z belongs to another MAC entity (i.e. another gNB), the channel switch event and measurement results of best candidate channels shall be handled in RRC layer. RRC layer may inform lower layer to initiate a handover according to preconfigured rules and parameters.

The event may then further trigger the UE to switch to the other non-serving channel/BWP/carrier/cell. A RA may be necessary if the UE doesn't have UL sync to the new serving channel/BWP/carrier/cell. If the new serving channel/BWP/carrier/cell doesn't contain PRACH resources, the UE may initiate a RA in yet other channel/BWP/carrier/cell that is in the same timing advance group as the selected new serving channel/BWP/carrier/cell. After the establishment of uplink sync, the UE then switch back to the new serving channel/BWP/carrier/cell. In the new serving channel/BWP/carrier/cell, the UE may need to send an uplink signaling to the gNB informing of the change of the serving channel/BWP/carrier/cell. The signaling may be carried by a RA procedure or other signaling means such as, for example, PUCCH, or MAC CE or RRC signaling. The gNB may provide acknowledgement to confirm the switching decision for the UE. The gNB may reject the switch for a UE if the gNB seems the switch is unnecessary for that UE.

In a fourth step, the network may configure a UE on whether the UE shall perform a switch to the other channel/BWP/carrier/cell, or perform an ordinary action such as BFR triggered RACH, or RLF recovery, or RA triggered for the SR failure. The configuration on the switch option may be configured for a UE per LCH/LCG/PUCCH-SR configuration/PRACH configuration.

Figure 2:
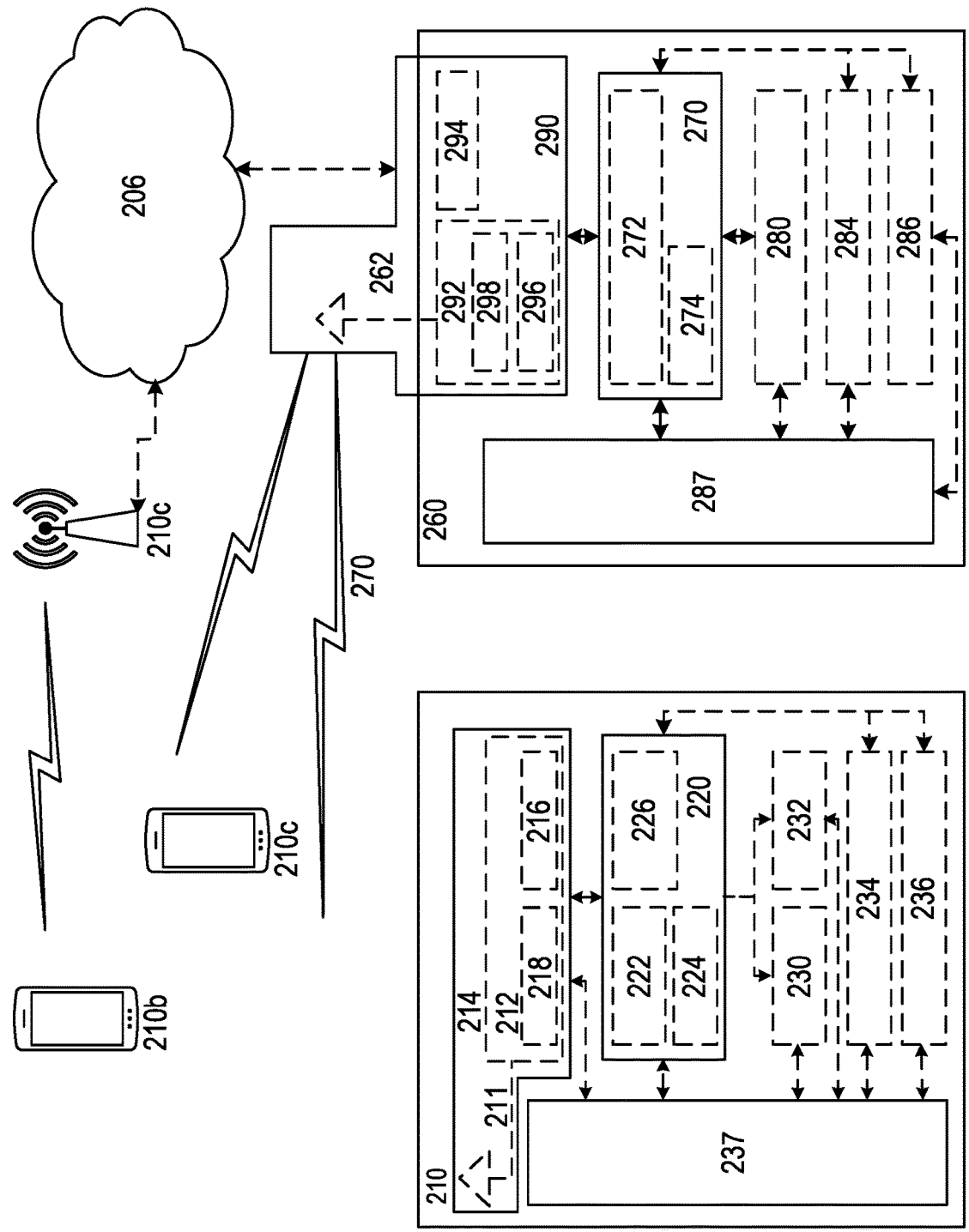
FIG. 2 shows a wireless network according to embodiments of the disclosure.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and WDs 210, 210b, and 210c. In practice, a wireless network may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
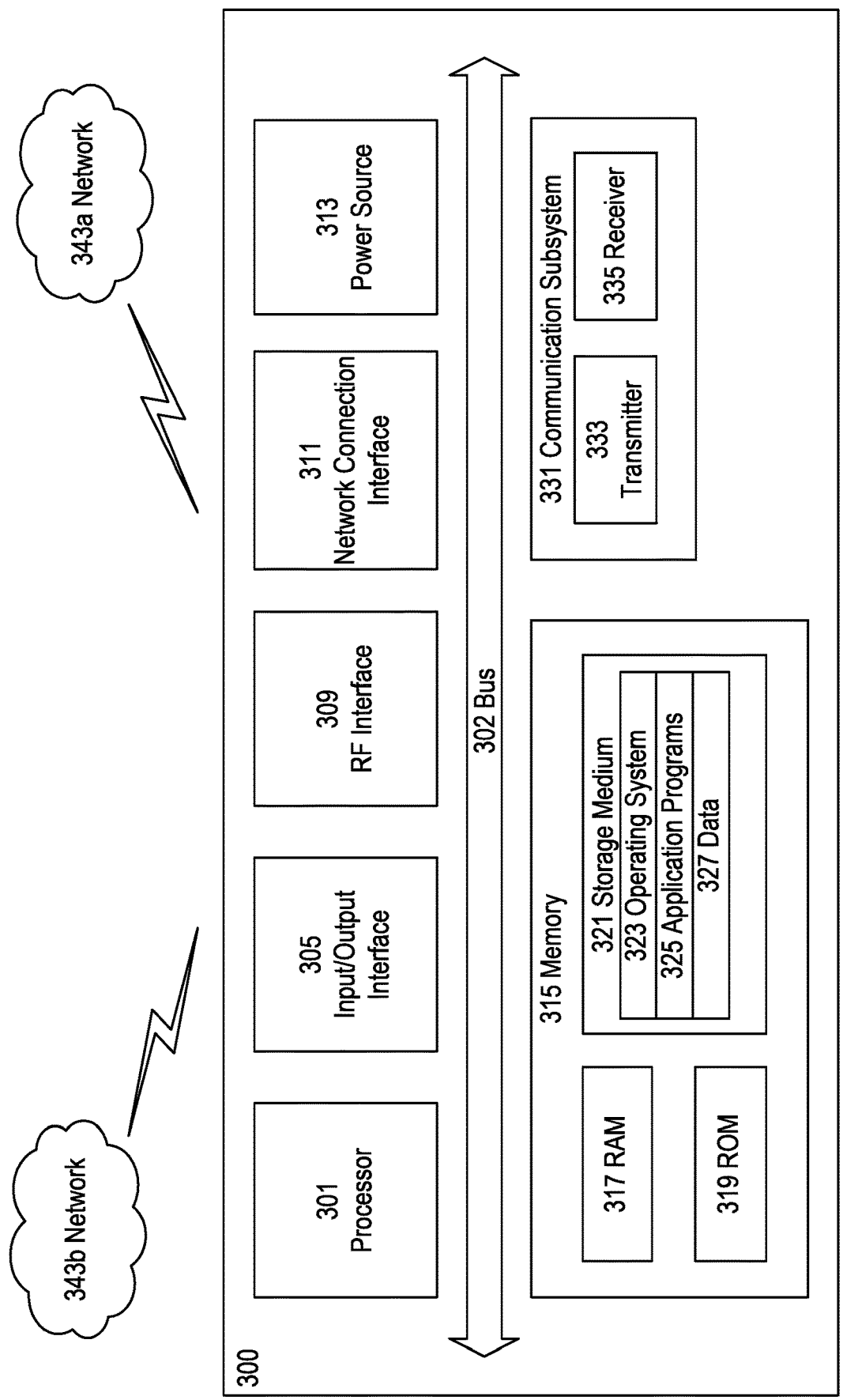
FIG. 3 shows a user equipment according to embodiments of the disclosure.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 3200 may be any UE identified by the $3^{rd}$ Generation Partnership Project (3GPP), including a NB-IoT UE, a machine type communication (MTC) UE, and/or an enhanced MTC (eMTC) UE. UE 300, as illustrated in FIG. 3, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343a. Network 343a may encompass wired and/or wireless networks such as a local-area network (LAN), a wide-area network (WAN), a computer network, a wireless network, a telecommunications network, another like network or any combination thereof. For example, network 343a may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343b using communication subsystem 331. Network 343a and network 343b may be the same network or networks or different network or networks. Communication subsystem 331 may be configured to include one or more transceivers used to communicate with network 343b. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343b may encompass wired and/or wireless networks such as a local-area network (LAN), a wide-area network (WAN), a computer network, a wireless network, a telecommunications network, another like network or any combination thereof. For example, network 343b may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
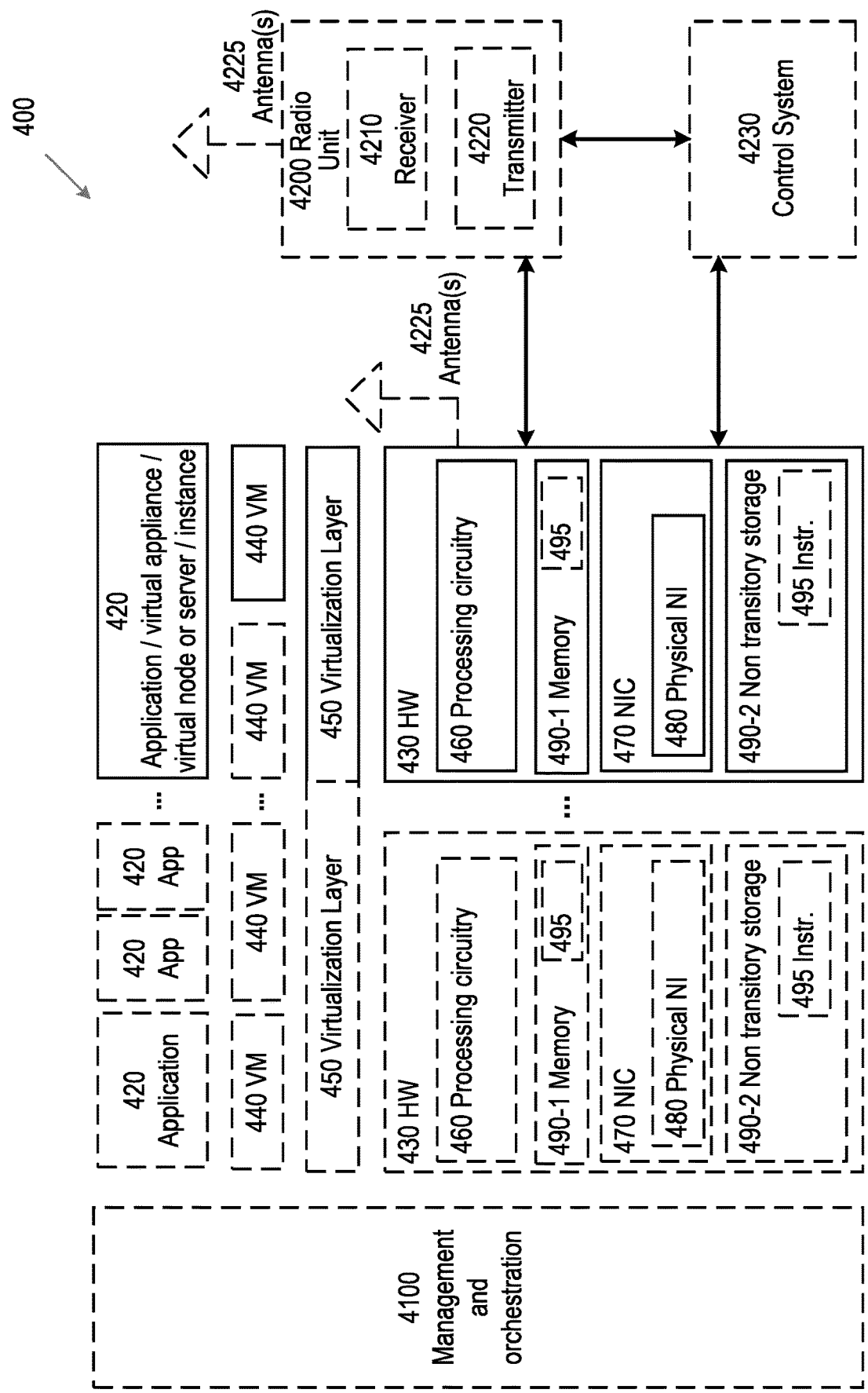
FIG. 4 shows a virtualization environment according to embodiments of the disclosure.

FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signalling can be effected with the use of control system 4230 which may alternatively be used for communication between the hardware nodes 430 and radio units 4200.

Figure 5:
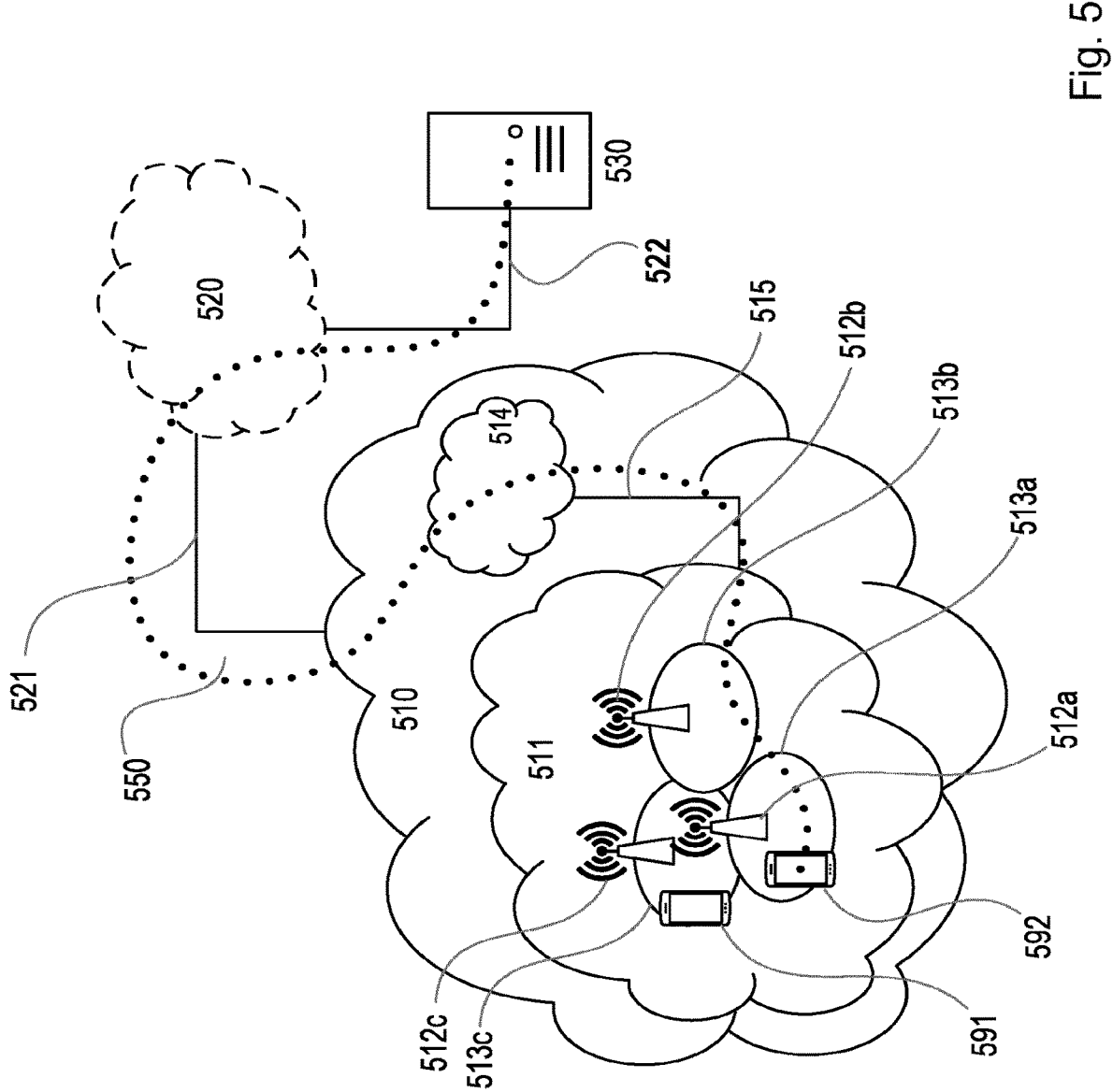
FIG. 5 shows a telecommunication network connected via an intermediate network to a host computer according to embodiments of the disclosure.

With reference to FIG. 5, in accordance with an embodiment, a communication system includes a telecommunication network 510, such as a 3GPP-type cellular network, which comprises access network 511, such as a radio access network, and core network 514. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more subnetworks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

Figure 6:
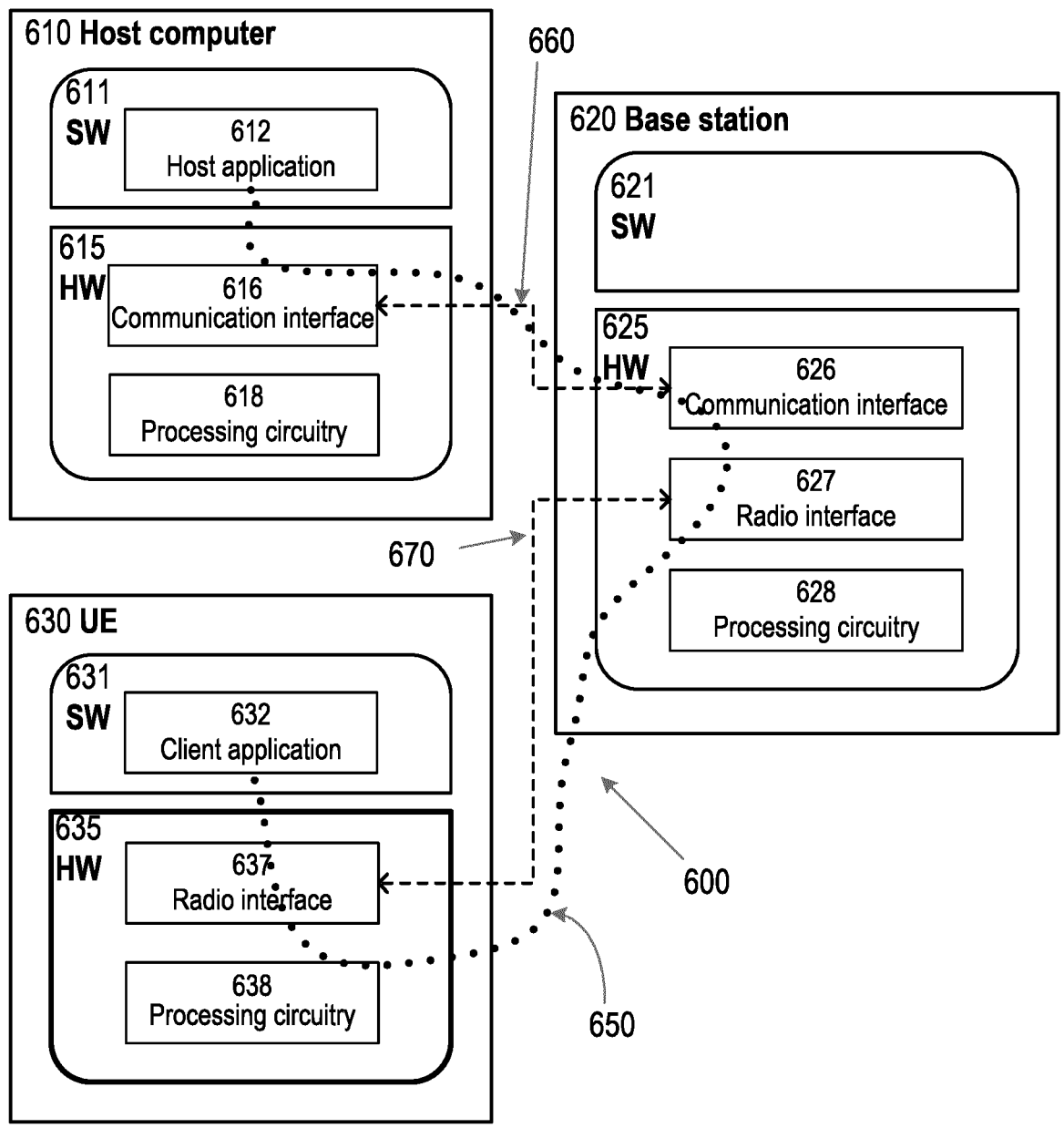
FIG. 6 shows a host computing communicating via a base station with a user equipment over a partially wireless connection according to embodiments of the disclosure.

It is noted that host computer 610, base station 620 and UE 630 illustrated in FIG. 6 may be similar or identical to host computer 530, one of base stations 512a, 512b, 512c and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the latency and thereby provide benefits such as improved user experience through fewer interruptions and shorter waiting times.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
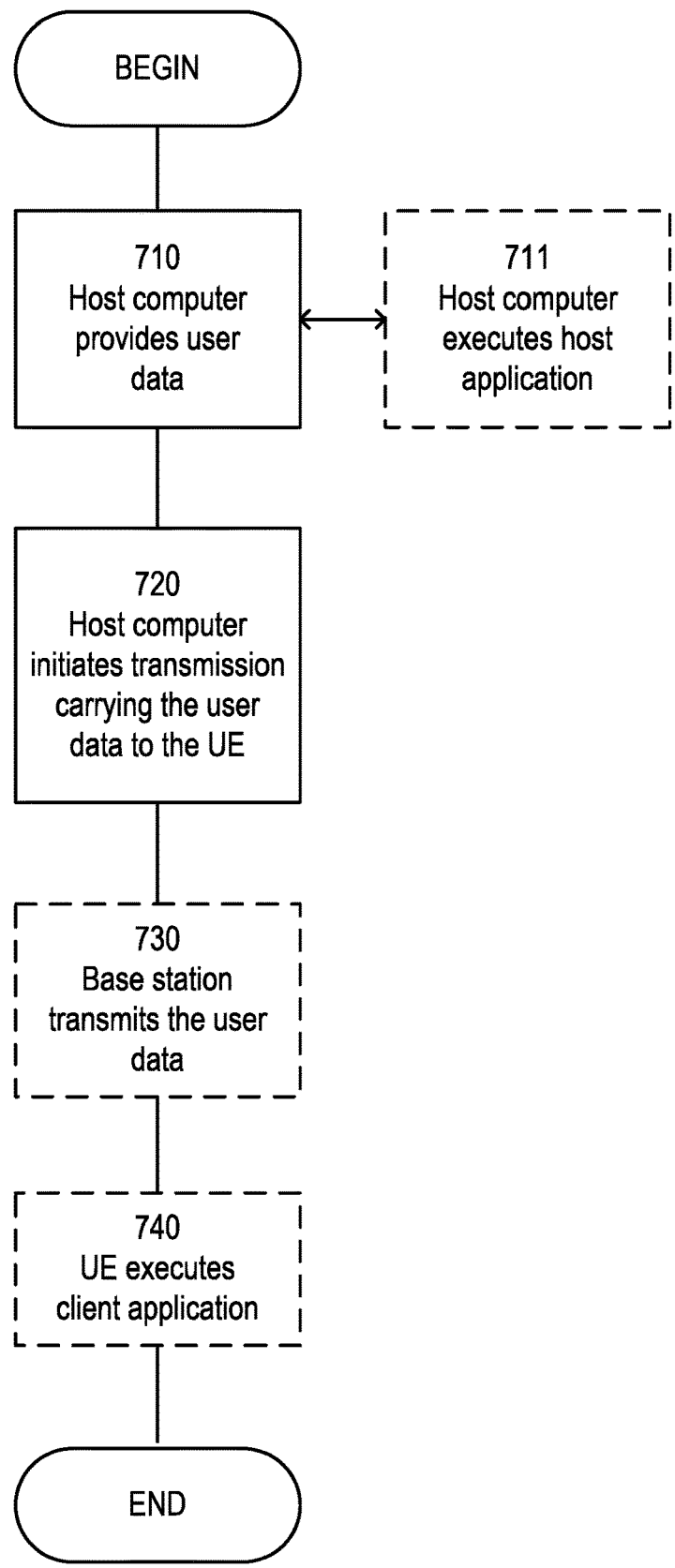
FIG. 7-10 are flowcharts of methods implemented in a communication system including a host computer, a base station, and a user equipment according to embodiments of the disclosure.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

Figure 8:
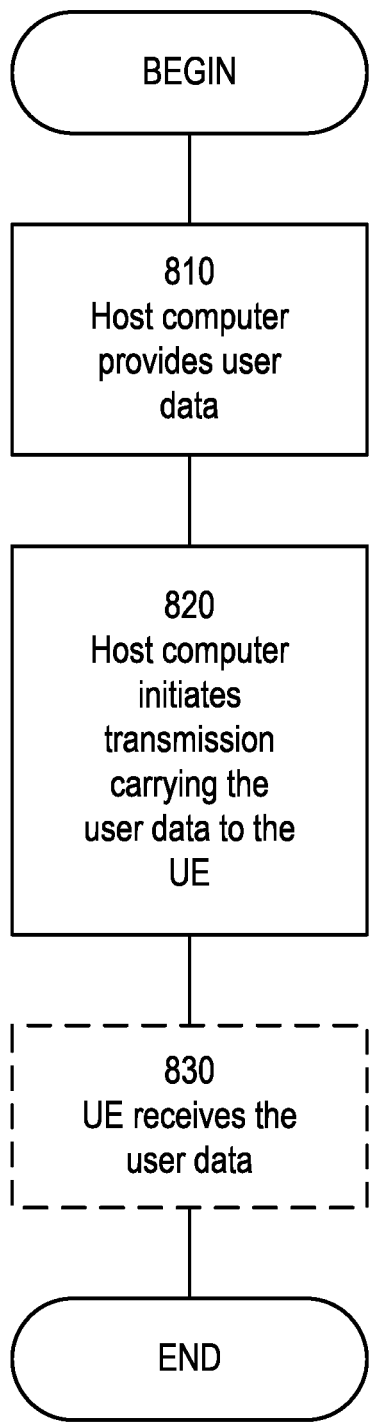

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figure 9:
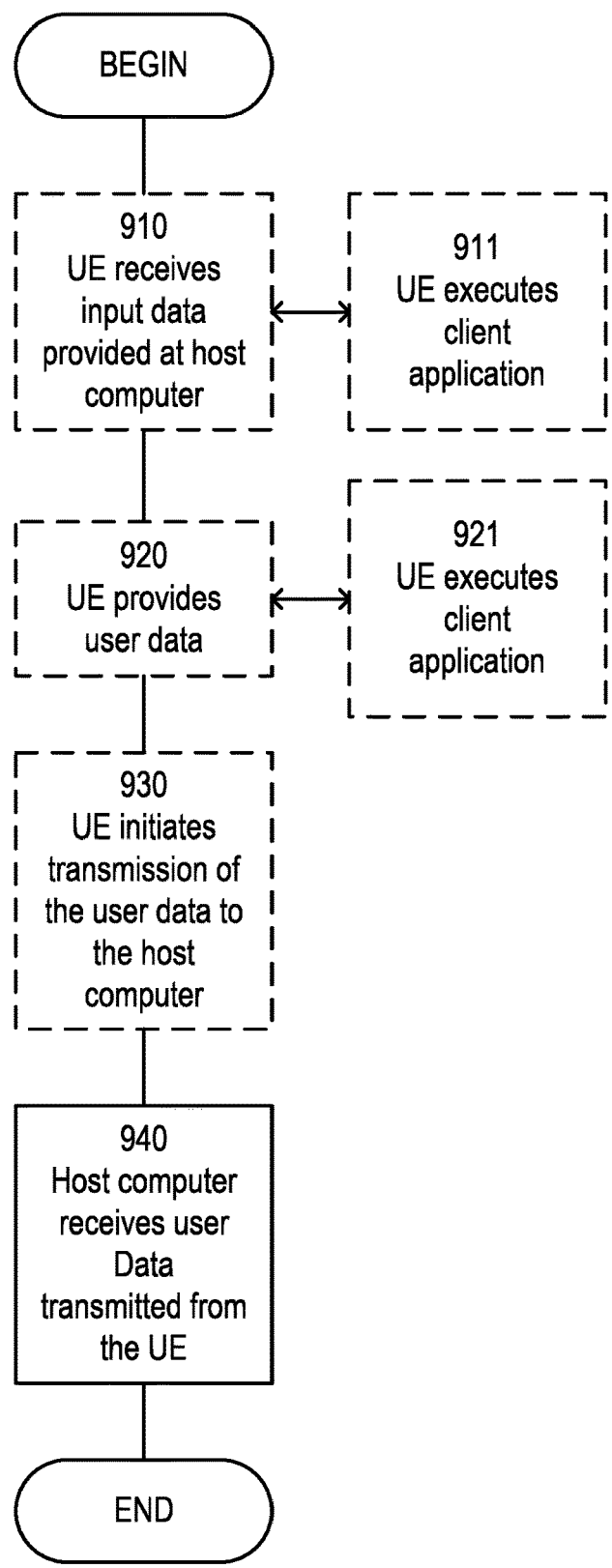

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

Figure 10:
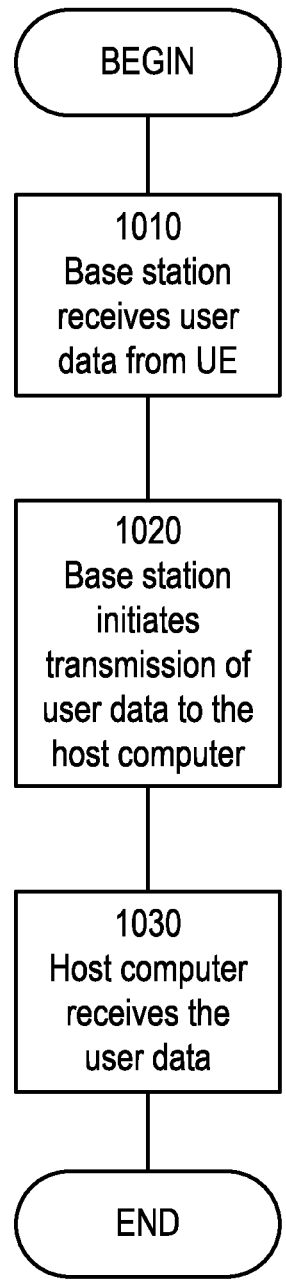

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Figure 11:
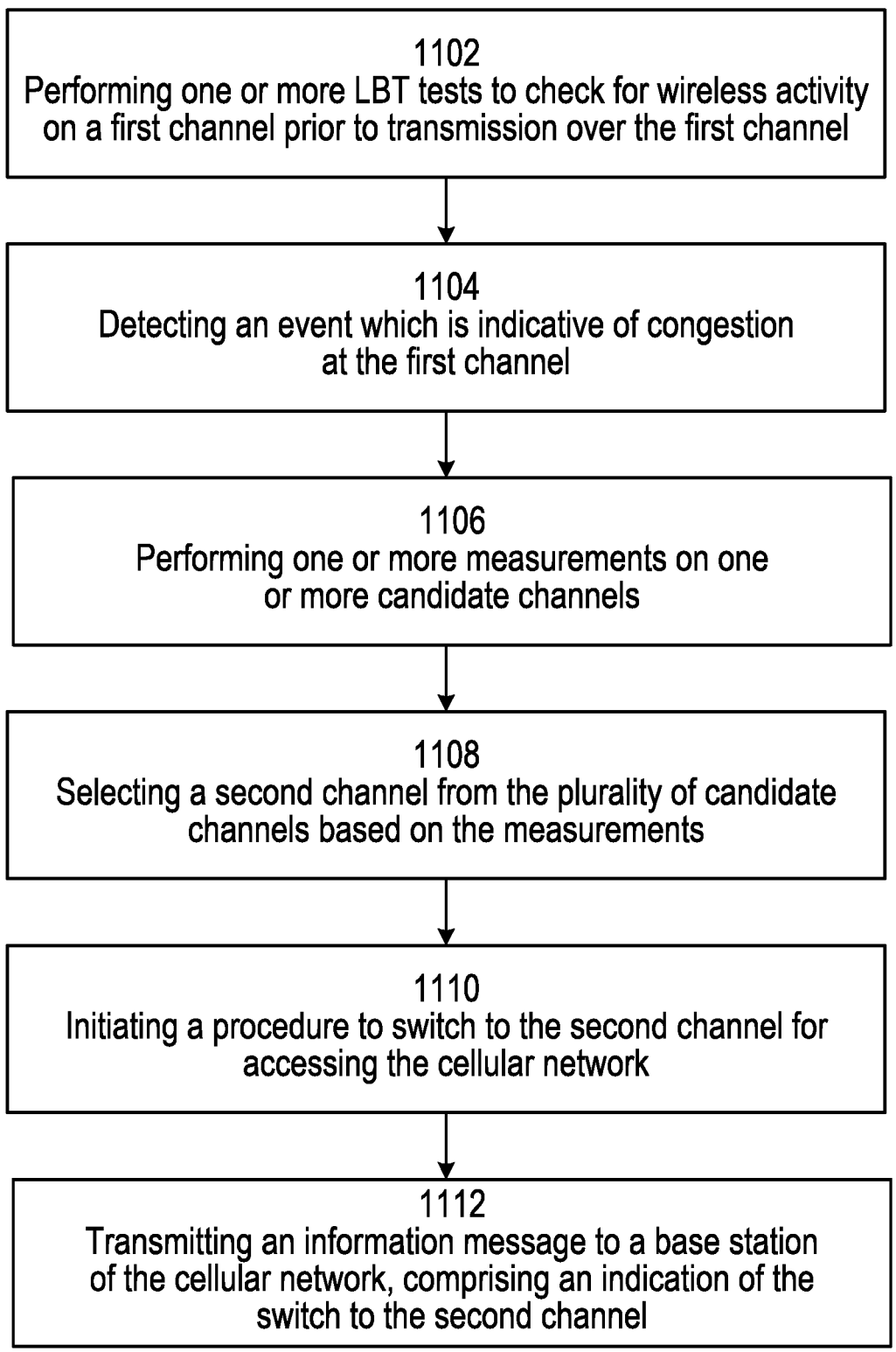
FIG. 11 is a flowchart of a method according to embodiments of the disclosure.

FIG. 11 depicts a method in accordance with particular embodiments. The method may be performed by a wireless device (such as the wireless device 210 described above with respect to FIG. 2, or the UE 300 described above with respect to FIG. 2). The wireless device is configured to communicate with a base station or network node of a cellular network (such as the network node 260 described above) over a first channel (e.g., one or more bands of transmission frequencies) using unlicensed spectrum. The base station may be a serving base station for the wireless device. The unlicensed spectrum further comprises one or more other channels (e.g., bands at different transmission frequencies, channels provided by different base stations, etc). The unlicensed spectrum may be shared between devices communicating using multiple radio access technologies (i.e., the RAT used by the wireless device to communicate with the base station, and at least one other RAT), such that any transmitting device is required to perform listen before talk (LBT) or a clear channel assessment (CCA) prior to transmitting over the transmission channel.

The method begins at step 1102, in which the wireless device performs one or more LBT tests to check for wireless activity on the first channel prior to transmitting over the first channel. For example, the LBT test may comprise a clear channel assessment (CCA) performed on the first channel prior to transmission. The CCA may comprise energy detection for a period of time over the first channel, or signal detection for a period of time over the first channel, and comparison of the detected energy/signal to one or more thresholds. If the detected energy/signal exceeds the threshold(s) (i.e., the LBT test fails), the wireless device defers from transmitting. Further, the wireless device may not re-attempt the transmission by performing a further LBT test for a period of time (e.g., back off). Multiple LBT tests may be performed before a transmission is successful.

Information concerning the LBT tests may be provided by the physical layer (PHY) to one or more upper layers in a protocol stack implemented in the wireless device. For example, the information may be provided to a MAC layer and/or a RRC layer.

In step 1104, the wireless device detects an event which is indicative of congestion at the first channel. For example, the event may be detected based on the LBT information obtained in step 1102, and particularly may relate to one or more LBT test failures.

In one embodiment, the event comprises detection of a maximum number of consecutive LBT failures being reached with respect to the transmission of one or multiple uplink physical channels, such as one or more of physical shared uplink channel (PUSCH), physical random access channel (PRACH), physical uplink control channel (PUCCH) and sounding reference signals (SRS). The consecutive LBT failures may be detected within a particular time interval or window. The consecutive LBT failures may be detected by the MAC layer, based on the information provided by the PHY layer in step 1102.

Alternatively or additionally, the event comprises a maximum time period elapsing since a transmission is triggered, and without the transmission taking place (e.g., due to LBT failures). For example, the transmission may be triggered in the MAC layer, and fail to be transmitted on the PHY layer before the maximum time period elapses. A timer may be initiated upon triggering of the transmission, and halted or cancelled upon transmission (or successful transmission). If the timer expires (reaches the maximum time period) without transmission (or successful transmission), this event may be detected. The maximum time period may consider both an initial transmission and any retransmission attempts. For example, the timer may only be halted or cancelled upon receipt of a positive acknowledgement message (ACK) or other indication that the transmission was successfully received (e.g., by a base station).

In other embodiments, the event may additionally or alternatively relate to LBT failures of a network node (e.g., a base station) attempting to transmit to the wireless device. That is, as noted above, all transmitting entities using unlicensed spectrum have to perform an LBT test prior to transmitting over the unlicensed spectrum. Therefore the base station may also experience LBT failures.

In such embodiments, the event may comprise detection of a maximum number of PUCCH SR transmission attempts without an UL grant in response from the base station. The maximum number of transmission attempts may again be counted within a particular (e.g., preconfigured) time interval or window. The failure to receive an UL grant may relate to failure at the wireless device to transmit the SR, and/or failure at the base station to transmit the UL grant.

Additionally or alternatively, the event may comprise a maximum time period elapsing since the wireless device last detected a downlink control reference signal. For example, the downlink control reference signal may comprise one or more (or all) of the downlink radio link monitoring (RLM) reference signals (e.g., synchronization signal blocks (SSB), channel state information reference signals (CSI-RS) or demodulation reference signals (DRS)). The failure to receive the downlink control reference signal(s) may relate to LBT failures experienced by the base station.

In further embodiments, the event may additionally or alternative relate to the detection congestion over the first channel via non-LBT methods. For example, the event may relate to the channel occupancy of the first channel (defined as the percentage of time that RSSI is measured above a configured threshold). If the channel occupancy exceeds a threshold (which may be preconfigured), the event may be detected.

In step 1106, e.g., responsive to detection of the event in step 1104, the wireless device performs one or more measurements on one or more candidate channels other than the first channel. The measurements may be instructed by one or more upper layers of the protocol stack implemented in the wireless device (e.g., RRC or MAC layer). The measurements may be performed by the PHY layer.

The measurements may comprise measurements of one or more of: channel occupancy, RSRP, RSRQ, RSSI, HARQ acknowledgement statistics, and ARQ retransmission statistics.

The candidate channels may relate to channels provided by the same base station as the first channel (e.g., different transmission channels, different bandwidth parts, different carriers, etc), or one or more different base stations (e.g., different transmission channels, different cells, different bandwidth parts, different carriers, etc).

In step 1108, the wireless device selects a second channel from the one or more candidate channels, based on the measurements performed in step 1106.

The selection of the second channel may be based on various different rules, and may depend on which parameters are measured in step 1106. For example, if one parameter is measured in step 1106, the candidate channel having the best value for that parameter may be selected as the second channel. In this context, the determination as to which value is "best" depends on the nature of the parameter. The best channel occupancy may be the lowest channel occupancy, the best RSSI may be the highest RSSI, and so on. If multiple parameters are measured in step 1106, the second channel may be selected based on the combination of values for the multiple parameters according to one or more rules. For example, a subset of one or more candidate channels may be first selected based on values for a first parameter (e.g. channel occupancy or RSSI), before the second channel is selected from the subset based on values for a second parameter (e.g., channel occupancy or RSSI). The subset may be determined by comparing the values for the first parameter to a threshold and selecting those channels whose values for the first parameter exceed or fall below the threshold (as appropriate). Alternatively, the subset may be determined by selecting a predefined number of channels having the best values for the first parameter. The second channel may be selected from the subset by choosing the channel with the best value for the second parameter. Of course, those skilled in the art will appreciate that various alternative methods are possible, and the present disclosure is not limited in that respect.

In step 1110, the wireless device initiates a procedure to switch to the second channel for accessing the cellular network. The nature of the procedure which is initiated may depend on the type of channel which is selected as the second channel.

In a first scenario, the second channel belongs to a different BWP of the current (i.e. serving) cell, or the second channel belongs to a carrier that belongs to the same MAC entity of the serving cell as the first channel (and carrier X is configured for the wireless device). In this case, the procedure may be initiated by either the RRC or MAC layer of the wireless device, and may comprise a handover procedure or, if uplink resources are available to the wireless device (e.g., over a shared channel such as PUSCH), transmission of a switch request from the wireless device to the serving base station. The switch request may comprise, for example, a MAC control element or RRC signalling. In either case (handover or switch request), the wireless device may transmit a request message to the base station comprising an indication of the second channel.

In a second scenario, the second channel belongs to a second carrier (carrier Y), which belongs to the same MAC entity of the serving cell as the first channel, but is not configured for the wireless device. In this case, the wireless device may utilize a random access procedure to configure the second carrier for the wireless device. The second carrier may be configured as a secondary cell for the wireless device (e.g., via RRC signaling). For example, the MAC layer may report the trigger event to the RRC layer as well as the measurement results from the physical layer. The RRC layer may then determine a random access procedure to setup a radio link with the new cell.

In a third scenario, the second channel belongs to a third carrier (carrier Z), which belongs to another MAC entity (e.g. a base station other than the serving base station). In this case, the wireless device may initiate a handover to the other base station. The handover procedure may be handled by the RRC layer of the wireless device.

Thus the wireless device switches to the second channel for accessing the cellular network. A random access procedure may be necessary if the wireless device is not synchronized with the second channel/BWP/carrier/cell. If the second serving channel/BWP/carrier/cell doesn't contain PRACH resources, the wireless device may initiate a random access procedure in a third channel/BWP/carrier/cell that is in the same timing advance group as the second channel/BWP/carrier/cell. After the establishment of uplink sync, the wireless device may then switch back to the second channel/BWP/carrier/cell.

In step 1112, the wireless device transmits an information message to a base station of the cellular network. The information message comprises an indication of the switch to the second channel. The information message may be transmitted over the second channel. The information message may be transmitted by a random access procedure or other signaling means such as one or more of PUCCH, MAC control element or RRC signaling. The base station may signal an acknowledgement message (not illustrated in FIG. 11) to confirm the switching decision for the wireless device. The base station may reject the switch for the wireless device if the base station deems the switch to be unnecessary.

The method outlined in FIG. 11 may be subject to a configuration by the base station. For example, the network (e.g., a serving base station) may configure the wireless device on whether to switch to another channel/BWP/carrier/cell, or to perform another action upon detection of one of the events outlined above with respect to step 1104. In this context, the other action may comprise one or more of beam failure recovery (BFR) triggered RACH, or radio link failure (RLF) recovery, or random access triggered by scheduling request failure. The configuration as to which option to take may vary in different scenarios. For example, the configuration may differ between different logical channels or logical channel groups, for different PUCCH-SR configurations, or different PRACH configurations. The configuration may be transmitted by the network via RRC signaling or system information, for example.

Figure 12:
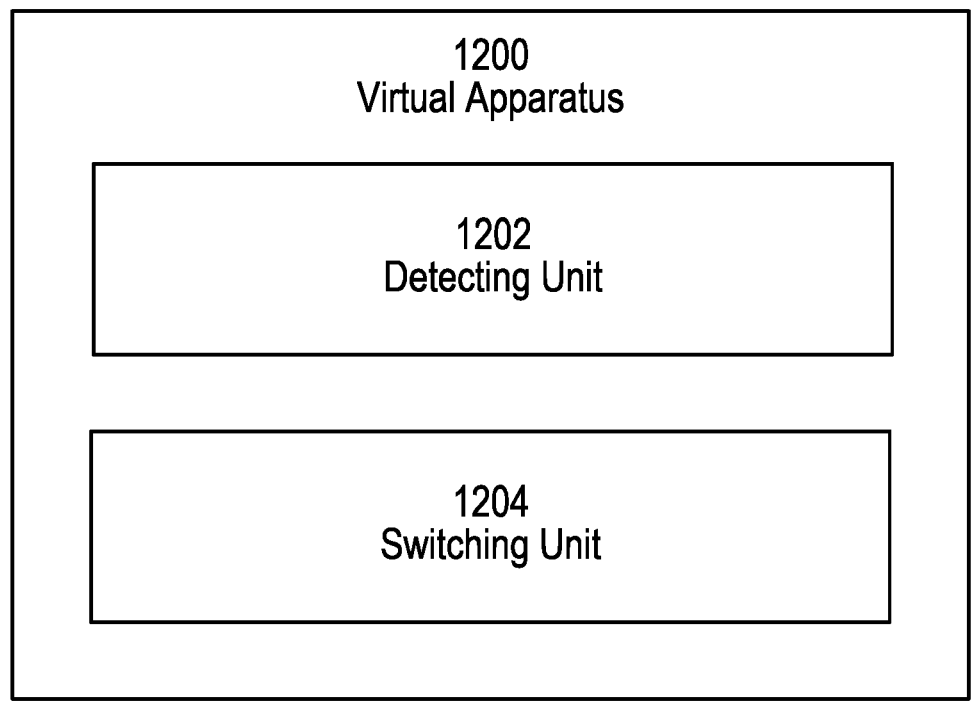
FIG. 12 is a virtualization apparatus according to embodiments of the disclosure.

FIG. 12 illustrates a schematic block diagram of an apparatus 1200 in a wireless network (for example, the wireless network shown in FIG. 2). The apparatus may be implemented in a wireless device (e.g., wireless device 210 shown in FIG. 2, or UE 300 shown in FIG. 3). Apparatus 1200 is operable to carry out the example method described with reference to FIG. 11 and possibly any other processes or methods disclosed herein. It is also to be understood that the method of FIG. 11 is not necessarily carried out solely by apparatus 1200. At least some operations of the method can be performed by one or more other entities. The apparatus 1200 may be configured to utilize a portion of wireless spectrum shared between multiple radio-access technologies. The portion of wireless spectrum comprises a plurality of channels at respective transmission frequencies.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause detecting unit 1202 and switching unit 1204, and any other suitable units of apparatus 1200 to perform corresponding functions according one or more embodiments of the present disclosure.

As illustrated in FIG. 12, apparatus 1200 includes detecting unit 1202 and switching unit 1204. Detecting unit 1202 is configured to detect an event which is indicative of congestion at a first channel of the plurality of channels. The first channel is assigned to the wireless device for accessing a cellular network. The switching unit 1204 is configured to initiate, responsive to detection of the event, a procedure to switch to a second channel of the plurality of channels for accessing the cellular network.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

For the avoidance of doubt, the following numbered statements set out embodiments of the disclosure:

Group A Embodiments

1. A method performed by a wireless device for utilizing a portion of wireless spectrum shared between multiple radio-access technologies, the portion of wireless spectrum comprising a plurality of channels at respective transmission frequencies, the method comprising:
    detecting an event which is indicative of congestion at a first channel of the plurality of channels, the first channel being assigned to the wireless device for accessing a cellular network; and
    responsive to detection of the event, initiating a procedure to switch to a second channel of the plurality of channels for accessing the cellular network.
2. The method of embodiment 1, further comprising performing a listen-before-talk, LBT, test to check for wireless activity on the first channel prior to each transmission over the first channel, and wherein the event which is indicative of congestion at the first channel relates to one or more failures of the LBT test.
3. The method of embodiment 2, wherein the event comprises a maximum number of consecutive failures of the LBT test being reached.
4. The method of embodiment 2 or 3, wherein the event comprises expiry of a defined time period, without successful transmission over the first channel, since a time at which a decision is taken to transmit over the first channel.
5. The method of any preceding embodiment, wherein the event comprises a maximum number of scheduling request transmissions being reached on the first channel without response from a base station of the cellular network.
6. The method of embodiment 5, wherein the maximum number of scheduling requests is defined with respect to a finite time interval.
7. The method of any preceding embodiment, wherein the event comprises expiry of a defined time period since the wireless device last successfully received a control signal from a base station of the cellular network over the first channel.
8. The method of any preceding embodiment, wherein the event comprises a channel occupancy of the first channel exceeding a threshold.
9. The method of any preceding embodiment, wherein the event is detected based on information provided by a physical, PHY, layer implemented in the wireless device.
10. The method of any preceding embodiment, wherein the procedure to switch to the second channel is initiated by a higher layer than a physical, PHY, layer implemented in the wireless device.
11. The method of embodiment 10, wherein the procedure to switch to the second channel is initiated by a media access control, MAC, layer or a radio resource control, RRC, layer implemented in the wireless device.
12. The method of any preceding embodiment, further comprising:
    responsive to detection of the event, performing one or measurements on a plurality of candidate channels other than the first channel; and
    selecting the second channel from the plurality of candidate channels, based on the measurements.
13. The method of embodiment 12, wherein the measurements comprise measurements of one or more of: channel occupancy, RSRP, RSRQ, RSSI, HARQ acknowledgement statistics, and ARQ retransmission statistics.
14. The method of any preceding embodiment, wherein the first channel and the second channel are both served by the same base station of the cellular network.
15. The method of embodiment 14, wherein the second channel belongs to a different bandwidth part, BWP, than the first channel, or wherein the second channel belongs to a second carrier, the first channel belongs to a first carrier, and the second carrier is configured for the wireless device.
16. The method of embodiment 14 or 15, wherein the procedure to switch to the second channel comprises a handover procedure.
17. The method of any one of embodiments 14 to 16, wherein the procedure to switch to the second channel comprises transmission by the wireless device of a request to switch BWP or carrier.
18. The method of embodiment 17, wherein the request to switch BWP or carrier comprises a media access control, MAC, control element or a radio resource control message.
19. The method of embodiment 14, wherein the second channel belongs to a second carrier, the first channel belongs to a first carrier, and the second carrier is not configured for the wireless device.
20. The method of embodiment 19, wherein the procedure to switch to the second channel comprises configuration of the second carrier for the wireless device.
21. The method of embodiment 20, wherein the second carrier is configured as a secondary cell for the wireless device.
22. The method of embodiment 20 or 21, wherein the procedure to switch to the second channel comprises a random access procedure.
23. The method of any preceding embodiment, wherein the first channel and the second channel are served by different base stations of the cellular network.
24. The method of embodiment 23, wherein the procedure to switch to the second channel comprises a handover procedure.
25. The method of any preceding embodiment, wherein the second channel does not comprise physical random access channel, PRACH, resources, and wherein the procedure to switch to the second channel of establishing uplink synchronization with a third channel of the plurality of channels, the third channel belonging to the same timing advance group as the second channel.
26. The method of any preceding embodiment, further comprising transmitting an information message to a base station of the cellular network, the confirmation message comprising an indication of the switch to the second channel.
27. The method of any preceding embodiment, further comprising receiving an acknowledgement message from a base station of the cellular network, the acknowledgement message comprising confirmation of the switch to the second channel 28. The method of any of the previous embodiments, further comprising:
providing user data; and
forwarding the user data to a host computer via a transmission over the second channel to the base station.

Group B Embodiments

29. A wireless device for utilizing a portion of wireless spectrum shared between multiple radio-access technologies, the wireless device comprising:
processing circuitry configured to perform any of the steps of any of the Group A embodiments; and
power supply circuitry configured to supply power to the wireless device.
30. A user equipment (UE) for utilizing a portion of wireless spectrum shared between multiple radio-access technologies, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
31. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
32. The communication system of the previous embodiment, wherein the cellular network further includes a base station configured to communicate with the UE.
33. The communication system of the previous 2 embodiments, wherein:
the processing circuitry of the host computer is configured to execute a host application, thereby providing the user data; and
the UE's processing circuitry is configured to execute a client application associated with the host application.
34. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
35. The method of the previous embodiment, further comprising at the UE, receiving the user data from the base station.
36. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.
37. The communication system of the previous embodiment, further including the UE.
38. The communication system of the previous 2 embodiments, further including the base station, wherein the base station comprises a radio interface configured to communicate with the UE and a communication interface configured to forward to the host computer the user data carried by a transmission from the UE to the base station.
39. The communication system of the previous 3 embodiments, wherein:
the processing circuitry of the host computer is configured to execute a host application; and
the UE's processing circuitry is configured to execute a client application associated with the host application, thereby providing the user data.
40. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.
41. A method implemented in a communication system including a host computer, a base station and a user equipment (UE), the method comprising:
at the host computer, receiving user data transmitted to the base station from the UE, wherein the UE performs any of the steps of any of the Group A embodiments.
42. The method of the previous embodiment, further comprising, at the UE, providing the user data to the base station.
43. The method of the previous 2 embodiments, further comprising:
at the UE, executing a client application, thereby providing the user data to be transmitted; and
at the host computer, executing a host application associated with the client application.
44. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
45. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

46. The method of the previous embodiment, further comprising at the base station, receiving the user data from the UE.

47. The method of the previous 2 embodiments, further comprising at the base station, initiating a transmission of the received user data to the host computer.

The invention claimed is:

1. A method performed by a wireless device for utilizing a portion of wireless spectrum shared between multiple radio-access technologies, the portion of wireless spectrum comprising a plurality of channels at respective transmission frequencies, the method comprising:
   performing a listen-before-talk, LBT, test to check for wireless activity on a first channel in the plurality of channels prior to each transmission over the first channel;
   detecting an event which is indicative of congestion at the first channel, the first channel being assigned to the wireless device for accessing a cellular network, wherein the event which is indicative of congestion at the first channel comprises a maximum number of consecutive failures of the LBT test being reached; and
   responsive to detection of the event, initiating a procedure to switch to a second channel of the plurality of channels for accessing the cellular network, wherein the first channel and the second channel are both served by the same base station of the cellular network, and wherein the second channel belongs to a different bandwidth part, BWP, than the first channel,
   wherein the event comprises one or more of:
      expiry of a defined time period since the wireless device last successfully received a control signal from a base station of the cellular network over the first channel; and
      a channel occupancy of the first channel exceeding a threshold.

2. The method of claim 1, wherein one or more of the following applies:
   the event is detected based on information provided by a physical, PHY, layer implemented in the wireless device; and
   the procedure to switch to the second channel is initiated by a higher layer than a physical, PHY, layer implemented in the wireless device.

3. The method of claim 1, further comprising:
   responsive to detection of the event, performing one or measurements on a plurality of candidate channels other than the first channel; and
   selecting the second channel from the plurality of candidate channels, based on the measurements.

4. The method of claim 3, wherein the measurements comprise measurements of one or more of: channel occupancy, RSRP, RSRQ, RSSI, HARQ acknowledgement statistics, and ARQ retransmission statistics.

5. The method of claim 1, wherein the procedure to switch to the second channel comprises transmission by the wireless device of a request to switch BWP.

6. The method of claim 1, further comprising performing a random access procedure for synchronizing with the second channel.

7. The method of claim 6, wherein the second channel does not comprise physical random access channel, PRACH, resources, and wherein the procedure to switch to the second channel includes establishing uplink synchronization with a third channel of the plurality of channels, the third channel belonging to the same timing advance group as the second channel.

8. The method of any claim 1, further comprising one or more of the following:
   transmitting an information message to a base station of the cellular network, the information message comprising an indication of the switch to the second channel; and
   receiving an acknowledgement message from a base station of the cellular network, the acknowledgement message comprising confirmation of the switch to the second channel.

9. A wireless device for utilizing a portion of wireless spectrum shared between multiple radio-access technologies, the wireless device comprising processing circuitry configured to:
   perform a listen-before-talk, LBT, test to check for wireless activity on a first channel in the plurality of channels prior to each transmission over the first channel;
   detect an event which is indicative of congestion at the first channel, the first channel being assigned to the wireless device for accessing a cellular network, wherein the event which is indicative of congestion at the first channel comprises a maximum number of consecutive failures of the LBT test being reached; and
   responsive to detection of the event, initiate a procedure to switch to a second channel of the plurality of channels for accessing the cellular network, wherein the first channel and the second channel are both served by the same base station of the cellular network, and wherein the second channel belongs to a different bandwidth part, BWP, than the first channel,
   wherein the event comprises one or more of:
      expiry of a defined time period since the wireless device last successfully received a control signal from a base station of the cellular network over the first channel; and
      a channel occupancy of the first channel exceeding a threshold.

10. The wireless device of claim 9, wherein one or more of the following applies:
   the event is detected based on information provided by a physical, PHY, layer implemented in the wireless device; and
   the procedure to switch to the second channel is initiated by a higher layer than a physical, PHY, layer implemented in the wireless device.

11. The wireless device of claim 9, wherein the wireless device is further configured to:
   responsive to detection of the event, perform one or measurements on a plurality of candidate channels other than the first channel; and
   select the second channel from the plurality of candidate channels, based on the measurements.

12. The wireless device of claim 11, wherein the measurements comprise measurements of one or more of: channel occupancy, RSRP, RSRQ, RSSI, HARQ acknowledgement statistics, and ARQ retransmission statistics.

13. The wireless device of claim 9, wherein the procedure to switch to the second channel comprises transmission by the wireless device of a request to switch BWP.

14. The wireless device of claim 9, further adapted to perform a random access procedure for synchronizing with the second channel.

15. The wireless device of claim 9, wherein the second channel does not comprise physical random access channel, PRACH, resources, and wherein the procedure to switch to the second channel includes establishing uplink synchronization with a third channel of the plurality of channels, the third channel belonging to the same timing advance group as the second channel.

16. The wireless device of claim 9, further comprising one or more of the following:
- transmitting an information message to a base station of the cellular network, the information message comprising an indication of the switch to the second channel; and
- receiving an acknowledgement message from a base station of the cellular network, the acknowledgement message comprising confirmation of the switch to the second channel.

* * * * *

UNITED STATES PATENT AND TRADEMARK OFFICE
CERTIFICATE OF CORRECTION

PATENT NO. : 12,022,507 B2
APPLICATION NO. : 17/276262
DATED : June 25, 2024
INVENTOR(S) : Wang et al.

Page 1 of 1

It is certified that error appears in the above-identified patent and that said Letters Patent is hereby corrected as shown below:

In the Specification

In Column 1, Line 62, delete "(LM)," and insert -- (LAA), --, therefor.

In Column 5, Line 21, delete "Control" and insert -- Control Element --, therefor.

In Column 9, Line 9, delete "(DRS))" and insert -- (DMRS)) --, therefor.

In Column 27, Line 41, delete "shared uplink" and insert -- uplink shared --, therefor.

In Column 28, Line 19, delete "(DRS))." and insert -- (DMRS)). --, therefor.

Signed and Sealed this
First Day of April, 2025

Coke Morgan Stewart
*Acting Director of the United States Patent and Trademark Office*